(12) United States Patent
Biswas et al.

(10) Patent No.: US 12,314,109 B2
(45) Date of Patent: May 27, 2025

(54) METHODS AND SYSTEMS FOR POWER MANAGEMENT OF READERS

(71) Applicant: Hand Held Products, Inc., Charlotte, NC (US)

(72) Inventors: Gourango Lal Biswas, Charlotte, NC (US); Gulshan Kumar, Charlotte, NC (US); Manish Sharma, Charlotte, NC (US); Pankaj Kumar Pandey, Charlotte, NC (US); Shyam Kumar Gornakonda, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/663,984

(22) Filed: May 18, 2022

(65) Prior Publication Data
US 2022/0374064 A1 Nov. 24, 2022

(30) Foreign Application Priority Data
May 19, 2021 (IN) .............. 202111022396

(51) Int. Cl.
*G06F 1/32* (2019.01)
*G06F 1/16* (2006.01)
*G06F 1/3206* (2019.01)
*G06K 7/10* (2006.01)

(52) U.S. Cl.
CPC .......... *G06F 1/3206* (2013.01); *G06F 1/1698* (2013.01); *G06K 7/10207* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 7,333,785 B1 * | 2/2008 | Lavelle | H04W 52/028 455/127.5 |
| 10,107,888 B1 * | 10/2018 | Choi | G06F 21/43 |
| 2009/0327769 A1 * | 12/2009 | Hatano | G06F 1/3246 713/300 |
| 2011/0074582 A1 * | 3/2011 | Alexis | G08B 13/2448 340/572.1 |
| 2011/0167287 A1 * | 7/2011 | Walsh | G06F 1/3209 713/323 |
| 2013/0318383 A1 * | 11/2013 | Takizawa | G06F 1/3234 713/323 |
| 2014/0153025 A1 * | 6/2014 | Min | G06K 15/406 358/1.14 |
| 2016/0337448 A1 * | 11/2016 | Gofman | A61B 5/14532 |
| 2017/0295545 A1 * | 10/2017 | Zacchio | H04W 52/0229 |

(Continued)

*Primary Examiner* — Phil K Nguyen
(74) *Attorney, Agent, or Firm* — Alston & Bird LLP

(57) ABSTRACT

Various embodiments illustrated herein disclose a computing device comprising a wake-up detect circuit configured to detect a state change of a link light emitting diode (LED) associated with the computing device. The wake-up detect circuit is configured to transmit a wakeup trigger signal to a processor to transit from a sleep mode to a wake-up mode in response to the detection of the state change of the link LED. The processor is configured to establish a connection between the computing device and another computing device via a communication link in the wake-up mode, the other computing device corresponds to a device that has caused the state change of the link LED.

14 Claims, 8 Drawing Sheets

(56) References Cited

U.S. PATENT DOCUMENTS

| | | | |
|---|---|---|---|
| 2018/0196773 A1* | 7/2018 | Barkaszi | G06F 13/4081 |
| 2018/0288208 A1* | 10/2018 | Lee | H04M 1/724092 |
| 2020/0106627 A1* | 4/2020 | Koper | H04L 12/12 |
| 2020/0327216 A1* | 10/2020 | Lin | G06F 21/34 |
| 2021/0123835 A1* | 4/2021 | Glennon | G01M 13/045 |

* cited by examiner

METHODS AND SYSTEMS FOR POWER MANAGEMENT OF READERS

CROSS-REFERENCE TO RELATED APPLICATIONS

This application claims priority pursuant to 35 U.S.C. 119(a) to India Patent Application No. 202111022396, filed May 19, 2021, which application is incorporated herein by reference in its entirety.

TECHNICAL FIELD

Example embodiments of the present disclosure relate generally to reader communication and, more particularly, to methods and systems for power management of readers.

BACKGROUND

In modern environments, such as, warehouses, industries, distribution centers, hotels, parcel services, etc., a reader system might be used for asset tracking and supply chain automation. For example, the reader system may include multiple RFID readers that may be positioned at fixed locations in a workplace (where the one or more assets are to be tracked). A problem associated with battery powered readers may be a limited battery life. However, managing power consumption of the readers to avoid battery drainage might be a key challenge.

BRIEF SUMMARY

Various embodiments illustrated herein disclose a computing device that includes a wake-up detect circuit configured to detect a state change of a link light emitting diode (LED) associated with the computing device. The wake-up detect circuit is further configured to, in response to the detection of the state change of the link LED, transmit a wakeup trigger signal to a processor to transit from a sleep mode to a wake-up mode. The processor configured to, in the wake-up mode, establish a connection between the computing device and another computing device via a communication link, the other computing device corresponds to a device that has caused the state change of the link LED.

Various embodiments illustrated herein disclose a method that includes detecting, by a wake-up detect circuit of a computing device, a state change of a link light emitting diode (LED) associated with the computing device. The method includes transmitting, by the wake-up detect circuit, a wakeup trigger signal to a processor of the first computing device to transit from a sleep mode to a wake-up mode, in response to the detection of the state change of the link LED. The method further includes, in the wake-up mode, establishing, by the processor, a connection of the computing device with another computing device via a communication link, where the other computing device corresponds to a device that has caused the state change of the link LED.

Various embodiments illustrated herein disclose a system that includes a mobile device communicatively coupled to one or more computing devices. The system includes a first computing device of the one or more computing devices that includes a first processor configured to receive a command from the mobile device, the command comprising at least a wake-up command. The first processor further configured to, in response of receiving the command, transit from a sleep mode to a wake-up mode and activate a first communication link of the first computing device. Furthermore, the first processor configured to establish a connection with a second computing device of the one or more computing devices so as to change a mode of the second computing device from a sleep mode to a wake-up mode by activating a link light emitting diode (LED) associated with the second computing device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
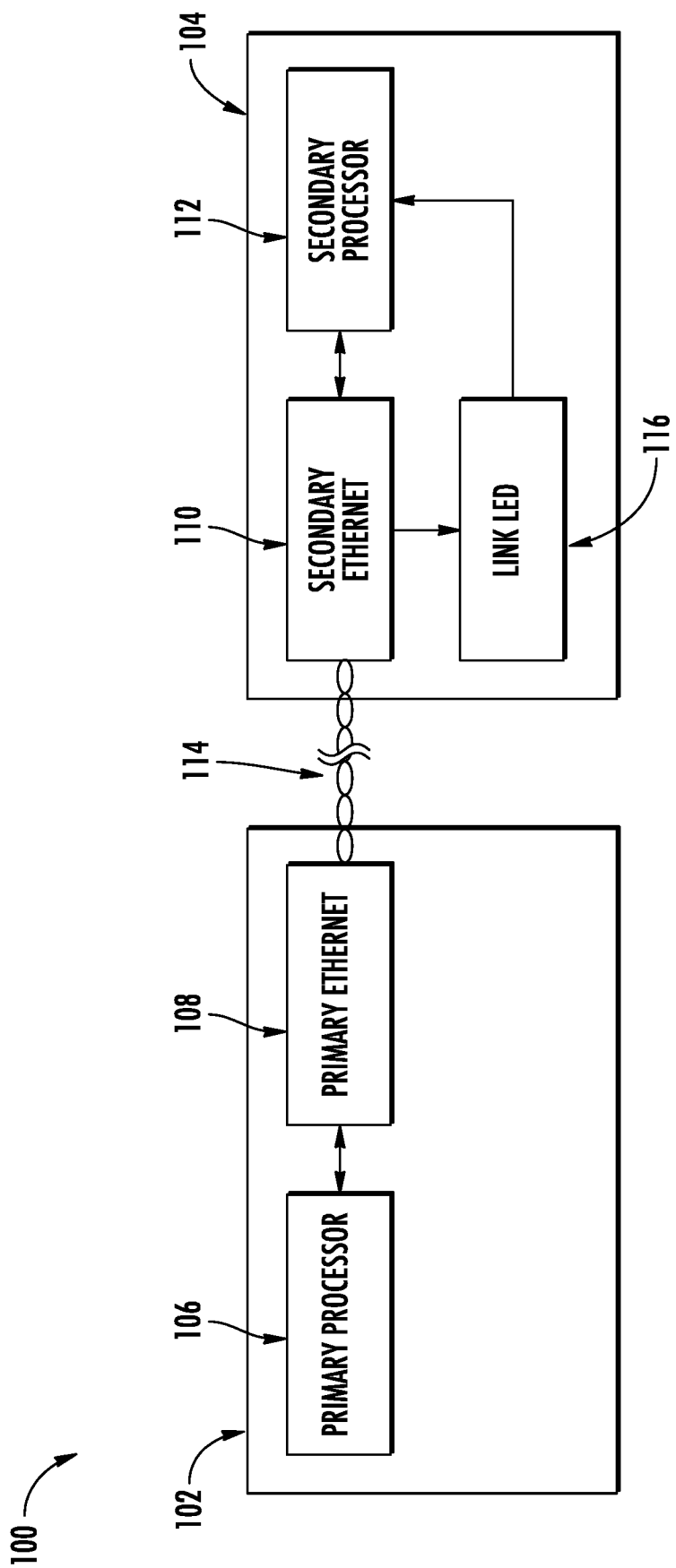
FIG. 1 illustrates a block diagram of a system environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "computing device" is used herein to correspond a device or apparatus (for example, an active element) that may be configured to take inputs, process the inputs, and then calculate results from the inputs. The computing device hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The term "wake-up detect circuit" in the present disclosure refers to a hardware or a software based circuit which wakes up a microcontroller from its low current sleep state based on received inputs. The inputs, in one example, may be pulse inputs.

The term "energy detect circuit" in the present disclosure refers to a circuit which measures energy of an incoming signal and generate an energy detect signal indicative of an energy level of the incoming signal. The energy detect circuit further compares the energy detect signal with a threshold energy level to carry out the operations, as discussed in later sections of the application.

The term "link LED" in the present disclosure refers to a light indicator, light fixture, or a visual indicator indicative of a network status of an Ethernet connection via an LED (light-emitting diode) connectable thereto.

The term "electronically coupled," "electronically coupling," "electronically couple," "in communication with," "communicatively coupled," or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "antenna element" is used herein to correspond to a device or apparatus (for example, an active element) that may be configured to generate radio frequency (RF) signals when a voltage signal is applied at the antenna element. For example, the antenna element may be configured to generate RF signal in high frequency (HF) band. Additionally, or alternatively, the antenna element may generate the RF signal in the ultra-high frequency (UHF) band. Additionally, or alternatively, the antenna element may generate the RF signal in other frequency band(s). In some examples, the antenna element may further comprise a matching circuit that, for example, is electronically coupled to the active element to generate the RF signals.

The term "radio frequency identification (RFID) tag" is used herein to correspond to an article, device, or apparatus that may an integrated circuit (IC), an antenna element, and/or a substrate. In an example embodiment, the antenna element and the IC may be fabricated on the substrate. In an example embodiment, the IC may be communicatively coupled to the antenna element through an interconnect on the substrate. In an example embodiment, the integrated circuit in the RFID tag may be configured to store encoded information or the encoded data. In some examples the RFID tag may be configured to operate in one or more RF frequency bands such as, but not limited to, 3 MHz-30 MHz (the HF band (for example, 13.56 MHz)) and/or 860 MHz-960 MHz (the UHF band). In some example embodiments, the RFID tag may have a dedicated power source that may enable the RFID tag to communicate with one or more components. Such RFID tags are referred to as active RFID tags. In alternative example embodiments, the RFID tag may not have a dedicated power source. Such RFID tags are referred to as passive RFID tags. In such embodiments, the RFID tag may have a power coupler that is capable of inducing electrical charge when the RFID tag is brought in an RF field. The induced electrical charge may thereafter be used to power the RFID tag itself.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In an example embodiment, a reader system may include one or more RFID readers mounted inside a package car or a delivery truck. The one or more RFID readers may be configured to read one or more RFID tags (placed on the one or more assets) either continuously or periodically. Further, the one or more RFID readers may be configured to update data, on a central server periodically. To facilitate the updating of the data on the central server, the one or more RFID readers may receive power via a POE (Power over Ethernet) which in turn receives power from a battery of the delivery truck. However, the one or more readers powered by the POE might have to be always active which consumes more power and may cause faster battery drain. In such scenarios, for example during a power outage and/or battery drainage situation, the one or more RFID readers might not be able to communicate the data to the central server.

With an intent to minimize power consumption, the one or more RFID readers may operate in sleep mode-wake mode configuration. The one or more RFID readers may comprise a primary RFID reader operating as a master reader and a secondary RFID reader operating as a slave reader. Thus, the primary RFID reader may wake-up from a sleep mode based on a sensor data, to communicate with the secondary RFID reader. However, pulling out a wakeup wire from the sensor to wake-up the secondary RFID reader might need additional wiring and may lead to labor issues. Therefore, the primary RFID itself may wake-up the secondary RFID reader, thereby, reducing the need of additional wiring.

In one embodiment, the primary RFID reader may correspond to a master RFID reader that may comprise a communication module, and a processor. In some examples, the communication module in the primary RFID reader may be battery powered and may be capable of communicating with a central server. The communication module may utilize one or more communication protocols, such as, but not limited to, Wireless Area Network (WAN), a Local Area Network (LAN), and/or a Metropolitan Area Network (MAN), for example, ethernet, 2G, 3G, 4G, 5G, Wireless Fidelity (Wi-Fi) network, WiMAX, ZigBee, Bluetooth, and/or the like to communicate with the central server.

In some embodiment, each of the one or more secondary RFID readers may correspond to a slave RFID reader that may comprise a communication module and a processor. The primary RFID reader and the one or more secondary RFID reader may communicate to each other via a communication link, for example but not limited to, an ethernet cable or any other wired interface.

In some examples, the primary RFID reader serving as the master RFID reader may control the operation of the secondary RFID reader. Initially, the primary RFID reader and the secondary RFID reader may stay in a sleep mode until an external actuation is received. The external actuation may comprise at least one, but not limited to, an actuation from a sensor associated with the primary RFID reader or in communication with the primary RFID reader, an external command from a device coupled to the primary reader, etc. The primary RFID reader on receiving the actuation may transit to a wake-up mode from the sleep mode, thereby, waking up the secondary RFID reader from a sleep state. Thus, the primary RFID reader or the secondary RFID reader might only wake-up from the sleep state when needed. In this way, the power consumption is reduced which in turn saves battery of the delivery truck or the package car. Further, controlling the mode of the secondary RFID reader by the primary RFID reader might eliminate the need of using an additional wake-up wiring between the sensor and the secondary RFID reader.

The above-description of the reader system comprising RFID readers may not limit the present application with RFID technology. It may be contemplated that any other type of readers such as optical reader, or etc. can be employed herein, without changing the scope of the invention.

Power over Ethernet (PoE) refers to a networking feature defined by the IEEE 802.3af and 802.3at standards. PoE facilitates Ethernet cables to supply power to networked devices over an existing data connection. PoE-capable devices can be power sourcing equipment (PSE), powered devices (PDs), or sometimes both. The device that transmits power is a PSE, while the device that is powered is a PD. The IEEE Power over the Ethernet (PoE) standard 802.3af, may improve the flexibility and capability of existing Ethernet networks by providing power over the same data connection media. Since, the PoE may provide power in a reliable manner over the same network connection as data, e.g., such as through Cat 5 or Cat 6 Ethernet cables, PoE can increase the flexibility of the placement of networked devices. The use of PoE is particularly useful for powering various network devices in some applications, such as, for example, Voice over Internet Protocol (VoIP) telephones, readers in warehouses and toll plaza. Additionally, when the PoE source is supplemented with an Uninterruptible Power Supply (UPS) as a power backup, PoE may be able to permit a network device to function during an AC power outage, which may be especially useful for VoIP telephones in emergency situations.

An Ethernet transceiver comprises a PHY (physical layer transceiver) and an MAC (Media Access Control). The Ethernet PHY refers to a physical layer transceiver device for sending and receiving Ethernet frames based on an OSI network model. In the OSI model, Ethernet covers Layer 1 (the physical layer) and part of Layer 2 (a data link layer) and defined by the IEEE 802.3 standard. The physical layer specifies the types of electrical signals, signaling speeds, media and connector types, and network topologies. It implements the Ethernet physical layer portion of the 1000BASE-T (1000 Mbps), 100BASE-TX (100 Mbps over copper), and 10BASE-T (10 Mbps) standards. The data link layer specifies how communication occur over the media as well as the frame structure of messages transmitted and received. This simply means how the bits come off the wire and into a bit arrangement so the data can be extracted from the bit stream. For Ethernet, this is called media access control, or MAC for short.

An RJ45 Ethernet port connectors of a standard Ethernet transceiver can be used to plug in Cat 5e cable and interconnect the networked devices. These connectors offer a set of LEDs (for example, a green color and an amber color LED) which may indicate different network statuses. Theses LEDs are connected directly to the Ethernet PHY. A link LED from the set of LEDs may indicate that there is an active connection on the Ethernet port. An activity LED from the set of LEDs may indicate that data is being transmitted or received between the Ethernet and the networked devices.

FIG. 1 illustrates a block diagram of a system environment 100 according to one or more embodiments described herein. In an example embodiment, the system environment 100 may include a first computing device 102 and a second computing device 104.

The first computing device 102 may comprise a primary processor 106 communicatively coupled to a primary Ethernet 108. The second computing device 104 may comprise a secondary processor 112 communicatively coupled to a secondary Ethernet 110, and a link Light Emitting Diode (LED) 116.

The primary processor 106 and/or the secondary processor 112 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof.

The first computing device 102 and/or the second computing device 104 may communicate with another computing device via a network (not shown in Fig). Examples of the network may include wired and/or wireless networks, such as but not limited to, a Wireless Fidelity (Wi-Fi) network, a Wireless Area Network (WAN), a Local Area Network (LAN), and/or a Metropolitan Area Network (MAN). Various devices in the system environment 100 can connect to the network in accordance with various wired and wireless communication protocols such as Transmission Control Protocol and Internet Protocol (TCP/IP), User Datagram Protocol (UDP), and 2G, 3G, 4G, or 5G communication protocols.

The term "computing device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The first computing device 102 and the second computing device 104 may communicate to each other via a wireless connection, a wired connection, an Ethernet network, and/or the like. In an example embodiment, the first computing device 102 and the second computing device 104 may communicate to each other via a communication link 114, for example but not limited to, an Ethernet cable, a RF coaxial cable, or any other wired interface. The primary Ethernet 108 and the secondary Ethernet 110 herein, may comprise an Ethernet physical layer transceiver for transmission and reception of data in accordance with the various communication protocols, such as, but not limited to, EPC global, DOD, I2C, TCP/IP, IEEE 802.3, UDP, and 2G, 3G, 4G or 5G communication protocols.

Initially, in a default state, both the first computing device 102 and the second computing device 104 may stay in the sleep mode or a power saving mode. In the sleep mode, both the computing devices may be idle and may utilize a backup battery. In the sleep mode, all the elements of the first computing device 102 may shut down to save power. However, a transmitter and an energy detect circuit of the second computing device may be active, rest all the elements (for example, transceivers) may shut down.

In an example embodiment, when the first computing device 102 wakes up from the sleep mode, a wake-up signal may be transmitted to the second computing device 104. In this regard, the link LED 116 of the second computing device 104 may indicate an activity at the secondary Ethernet 110. The link LED 116 herein, may be located at an Ethernet port. The link LED 116 may glow in response of receiving the signal from the first computing device 102. In this way, the link LED 116 may communicate with the secondary processor 112 to activate the second computing device 104 from the sleep mode. Furthermore, in an example, the link LED 116 may communicate to the secondary processor 112 via a communication link, for example, a hard wire line (hereinafter referred to as a wakeup line).

In some instances, the link LED 116 may also reflect a status of connection on the corresponding Ethernet port. In simple words, the link LED 116 in turned ON state may indicate that there is an active connection on the Ethernet port.

Figure 2:
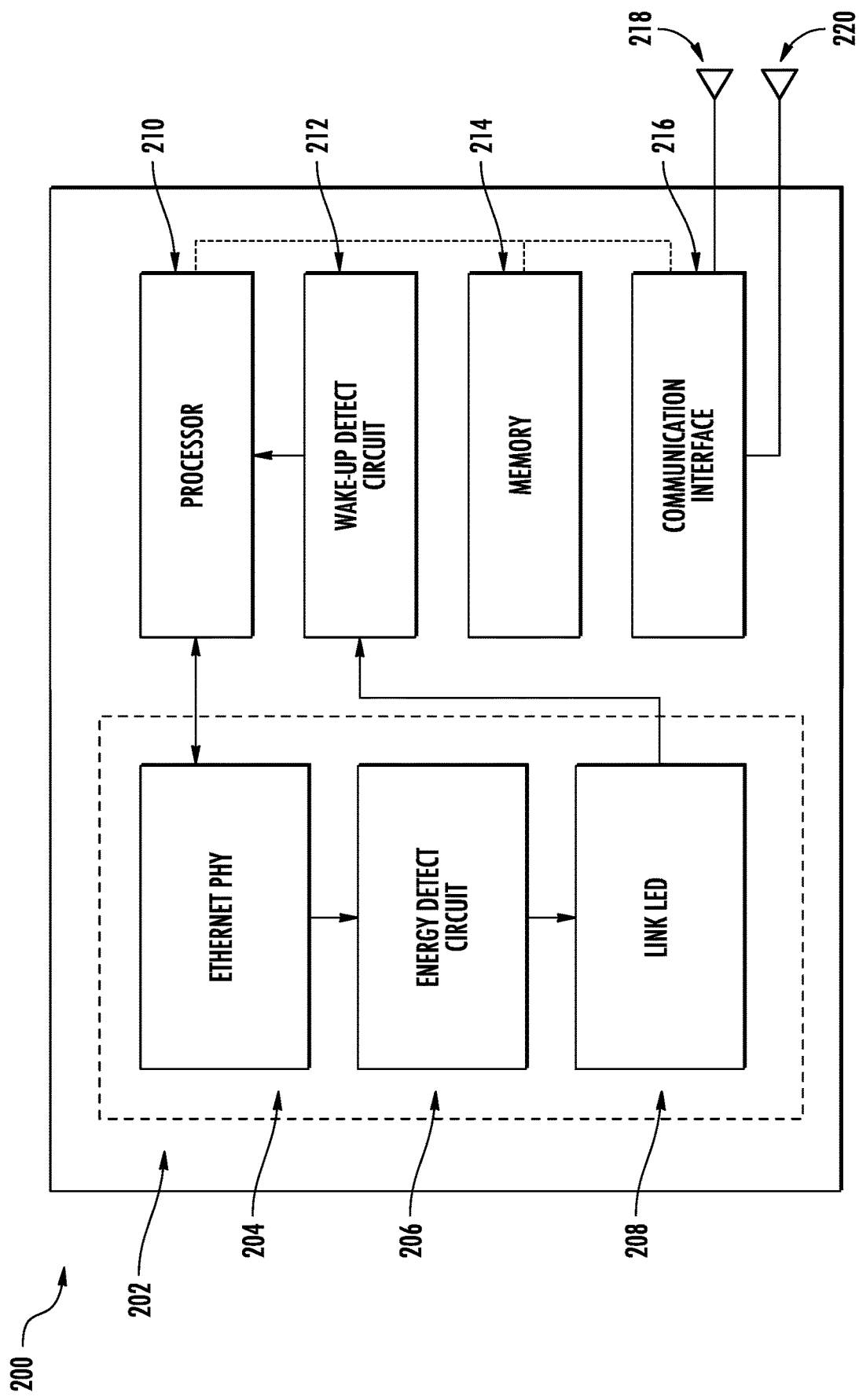
FIG. 2 illustrates a block diagram of the second computing device, according to one or more embodiments described herein.

FIG. 2 illustrates a block diagram of the second computing device 200 (referred in FIG. 1 as 104), according to one or more embodiments described herein. In an example embodiment, the second computing device 200 may comprise an Ethernet module 202, a processor 210, a wake-up detect circuit 212, a memory unit 214, and a communication interface 216. The Ethernet module 202 may comprise an ethernet PHY 204, an energy detect circuit 206, a link LED 208.

The processor 210 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 2 as a single processor, in an embodiment, the processor 210 may include a plurality of processors and signal processing modules. The plurality of processors may be embodied on a single electronic device or may be distributed across a plurality of electronic devices collectively configured to function as the circuitry of the second computing device 200. The plurality of processors may be in operative communication with each other and may be collectively configured to perform one or more functionalities of the circuitry of second computing device 200 as described herein. In an example embodiment, the processor 210 may be configured to execute instructions stored in the memory unit 214 or otherwise accessible to the processor 210. These instructions, when executed by the processor 210, may cause the circuitry of second computing device 200 to perform one or more of the functionalities, as described herein.

Whether configured by hardware, firmware/software methods, or by a combination thereof, the processor 210 may include an entity capable of performing operations according to embodiments of the present disclosure while configured accordingly. Thus, for example, when the processor 210 is embodied as an ASIC, FPGA or the like, the processor 210 may include specifically configured hardware for conducting one or more operations described herein. Additionally, or alternatively, when the processor 210 is embodied as an executor of instructions, such as may be stored in the memory unit 214, the instructions may specifically configure the processor 210 to perform one or more algorithms and operations described herein.

Thus, the processor 210 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory unit 214 may include suitable logic, circuitry, and/or interfaces that are adapted to store a set of instructions that is executable by the processor 210 to perform predetermined operations. Additionally, or alternately, the memory unit 214 may be configured to store data, for example, tag ID data. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory unit 214 may be integrated with the processor 210 on a single chip, without departing from the scope of the disclosure.

The communication interface 216 may include suitable logic and/or circuitry that may enable the communication interface 216 to facilitate transmission and reception of messages and data to and from various devices. For example, the communication interface 216 may be communicatively coupled with a central server or a database. Examples of the communication interface 216 may include, but are not limited to, an antenna, an Ethernet port, a USB port, a serial port, or any other port that can be adapted to receive and transmit data. The communication interface 216 may transmit and receive data and/or messages in accordance with the various communication protocols, such as, but not limited to, EPC global, DOD, I2C, TCP/IP, UDP, and 2G, 3G, 4G or 5G communication protocols.

In some examples, the communication interface 216 may facilitate the communication with a first antenna element 218 and a second antenna element 220. The first antenna element 218 may be positioned to be spatially apart from the second antenna element 220. Such positioning of the first antenna element 218 and the second antenna element 220 (spatially apart from each other) may reduce the interference between the signals transmitted/received via the first antenna element 218 and the second antenna element 220. In some examples, the communication interface 216 may be configured to transmit/receive data through the first antenna element 218 and the second antenna element 220 by utilizing one or more of EPC global communication standards or DOD communication standards.

The Ethernet module 202 comprises the ethernet PHY 204, the energy detect circuit 206, and the link LED 208. The ethernet PHY 204 and the link LED 208 may be communicatively coupled to the processor 210. As explained earlier, the ethernet PHY 204 may correspond to an Ethernet physical layer transceiver for transmission and reception of data. Initially, the second computing device 200 may be in a deep sleep mode where all the elements and modules might be shut down, except a transmitter (not shown in figure) and the energy detect circuit 206. Similarly, all the elements, for example, a clock unit, an on-chip oscillator of the processor 210 may be shut down in the deep sleep mode.

When the ethernet PHY 204 receives the wake-up signals, in an example, but not limited to link pulses, the energy detect circuit may detect these link pulses. In other words, the energy detect circuit may detect an amount of energy transmitted from the primary Ethernet 108 of the first computing device 102 (shown in FIG. 1). The term "amount of energy" corresponds to reception of link pulses from the primary Ethernet 108. In this regard, the energy detect circuit upon detection of the link pulses triggers the link LED 208 that may cause the link LED 208 to change its state from LOW to HIGH.

In accordance with the above disclosure, a state change signal from the link LED 208 of the Ethernet module 202 may be given as an input to the wake-up detect circuit 212, which in turn activates the processor 210. An output of the wake-up detect circuit 212 may be reflective of the state change of the link LED 208. This output of the wake-up detect circuit 212 may be given as a pulse input to the processor 210. For example, the pulse input may be, but not limited to a square wave or a rectangular wave. In another embodiment, the link LED 208 may trigger the processor 210 directly to transit from the deep sleep mode to the wake-up mode. After the processor 210 transits to the wake-up mode, the second computing device 200 may be able to communicate with the first computing device 102. The above description of the second computing device 200 may not be limited but may also be used to describe the first computing device 102 as well.

Figure 3:
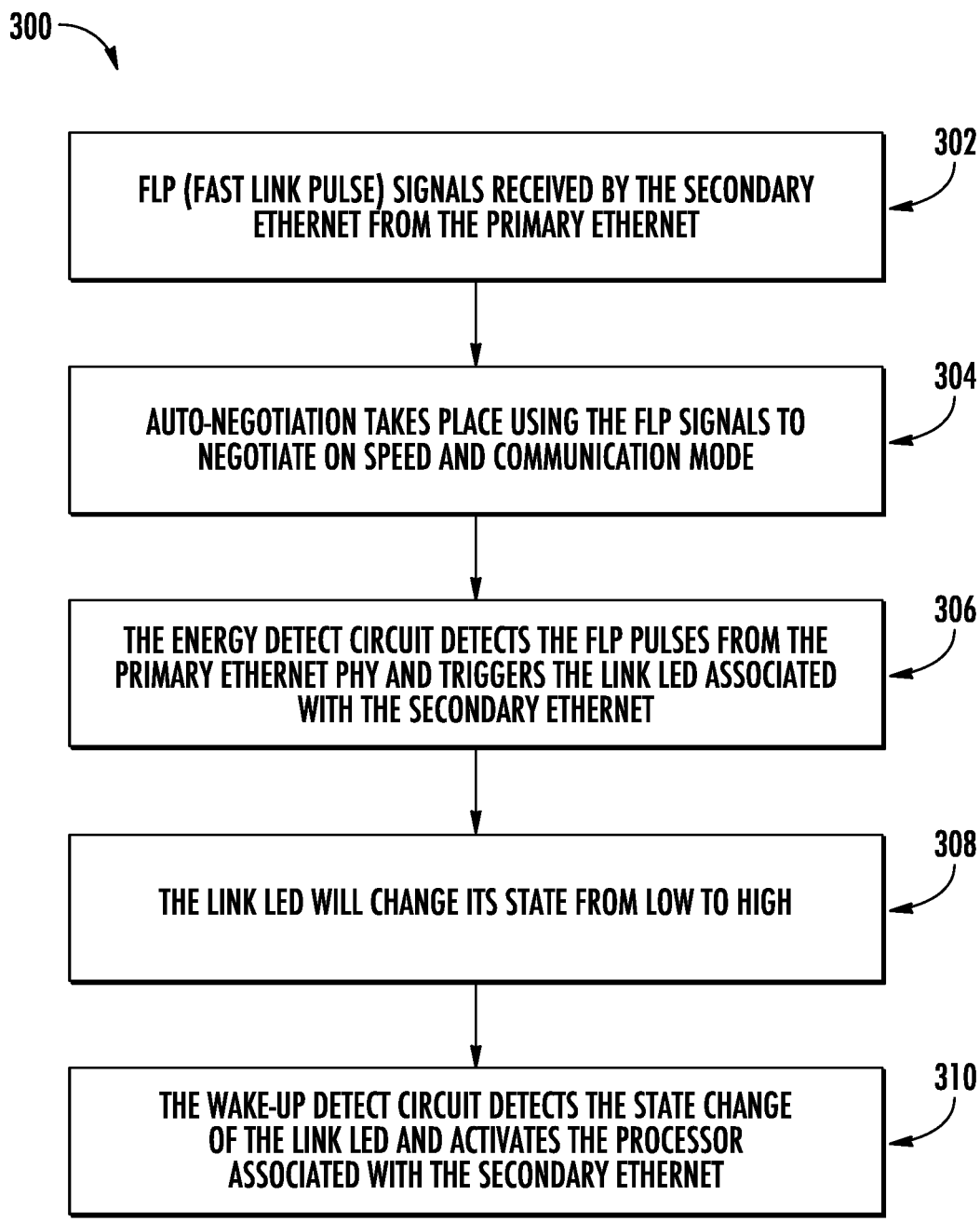
FIG. 3 illustrates a flow diagram illustrating steps of operation of an Ethernet module, according to one or more embodiments described herein.

FIG. 3 illustrates a flow diagram illustrating steps of operation of an Ethernet module, according to one or more embodiments described herein. By default, the first computing device 102 may be in the deep sleep mode. Thus, the primary ethernet 108 (as shown in FIG. 1) of the first computing device 102 transits from the deep sleep mode to the wake-up mode. The transition may depend upon receiving an actuation signal from the sensor. The sensor may be external or internal to the first computing device 102. The sensor, for example, may be a motion sensor, an ignition sensor, a vibration sensor, or etc. Based on the sensor data that may include sensed motion data, sensed ignition data or sensed vibration data, the primary Ethernet 108 may be activated. These sensed data may be given as the actuation signal to the primary Ethernet 108; however, the actuation signal may not be limited to only sensors.

In an example embodiment, the actuation signal may be received from a mobile device operating in the vicinity of the primary ethernet 108.

In some examples, the actuation signal may also be received from a hardware trigger given by an operator.

In an example embodiment, the primary Ethernet 108 upon waking up may initiate communication with the secondary Ethernet 110. As already discussed, the primary Ethernet 108 and the secondary Ethernet 110 may communicate to each other via a wired/wireless interface in accordance with the various communication protocols, such as, but not limited to, EPC global, DOD, I2C, TCP/IP, IEEE 802.3, UDP, and 2G, 3G, 4G or 5G communication protocols.

The primary Ethernet 108 for communication may transmit Fast Link Pulse (FLP) signals to the secondary Ethernet 110. These FLP signals may correspond to a modified version of a conventional Normal Link Pulse (NLP) signals. The FLP signals may be generated automatically at powerup and comprises a burst of pulses. The FLP signals may be used for verifying link integrity and may contain information about device capabilities. Thus, these FLP pulses may be received by the secondary Ethernet 110 from the primary Ethernet 108 (depicted at step 302).

An auto-negotiation may take place between the primary Ethernet 108 and the secondary Ethernet 110 using the FLP pulses. During the auto-negotiation, the primary Ethernet 108 and the secondary Ethernet 110 may advertise their capabilities to each other over the communication link 114. The auto-negotiation may allow different link partners or can say different Ethernets to communicate to each other by negotiating on a speed and capabilities. For an example, suppose the primary Ethernet 108 may have a 100BASE-Tx network segment and the secondary Ethernet 110 may have a 10BASE-T network segment. Both the 100BASE-Tx and the 10BASE-T Ethernet standards may possess different speeds and different duplex operation mode. This difference may act as a barrier in communication. Since, the different Ethernets operate at different speeds and some may operate half-duplex while others may operate at full-duplex, there needs to be a mechanism whereby the different ethernets or link partners can agree on common speed and duplex modes that may be suitable for communication. The auto-negotiation process may comprise a mechanism whereby, using the FLP pulses the primary Ethernet 108 and the secondary Ethernet 110 may automatically configure themselves to operate at a common speed and duplex mode that they can both cope with (depicted at step 304). Thus, as a result of the auto-negotiation process, a lowest speed and duplex setting common between the primary Ethernet 108 and the secondary Ethernet 110 might be selected as a mode of operation.

The FLP pulses may be detected by the energy detect circuit 206 (shown in FIG. 2) from the primary Ethernet 108. The energy detect circuit 206 may then generate a trigger signal to activate the link LED 208 (depicted at step 306). As described earlier, the link LED 208 herein, may be located at the Ethernet port. The link LED 208 may glow on receiving the trigger signal corresponding to the FLP pulses from the energy detect circuit 206.

In accordance with an exemplary embodiment, the link LED 208 by default may be in low state, i.e. in turned OFF state. In response of receiving the trigger signal, the link LED 208 may change its state from LOW to HIGH, i.e. moves from the default OFF state to an active HIGH state (depicted at step 308). In some examples, the glowing of the link LED 208 may indicate that a cable is plugged-in into the Ethernet port. In simple words, the primary Ethernet 108 might have been physically connected to the secondary Ethernet 110.

This state change of the link LED 208 may be detected by the wake-up detect circuit 212 which may interpret the state change signal as an activation signal for the processor 210 (or can be referred to 112 of the FIG. 1) associated with the secondary ethernet 110 (depicted at step 310). The activation signal from the wake-up detect circuit 212 may activate the processor 210, thereby, pulling the processor 210 from the deep sleep mode to the wake-up mode. Thus, the activation of the processor 210, (or can say, 112) wakes up the second computing device 104. In this way, the communication might be established between the first computing device 102 and the second computing device 104, thereby, reducing the power consumption.

The first computing device 102 may transmit a sleep command to the second computing device 104 to bring the second computing device 104 back to the deep sleep mode.

In another example embodiment, the first computing device 102 transiting from the sleep mode to the wake-up mode based on the actuation signal may wait for a predefined time period before going back to the deep sleep mode. For example, suppose the first computing device 102 may get triggered from the ignition sensor but no activity detected, the first computing device 102 waits for the predefined time period (example, 20 minutes). If no activity detected until the predefined time period reached, the first computing device 102 may transit to the deep sleep mode.

Figure 4:
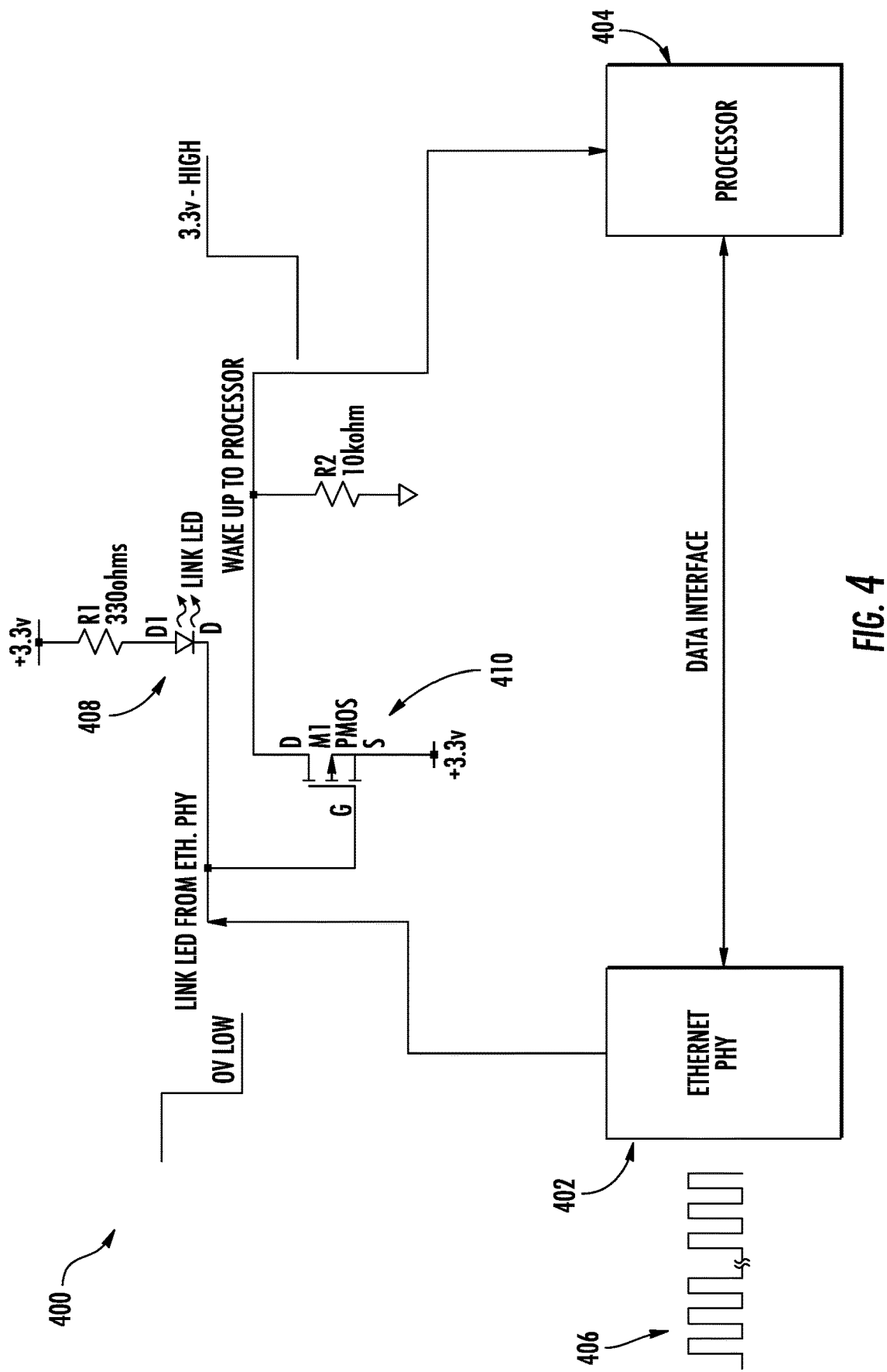
FIG. 4 illustrates a schematic circuit diagram illustrating the sleep-wake up mode operation, according to one or more embodiments described herein.

FIG. 4 illustrates a schematic circuit diagram illustrating the sleep-wake up mode operation, according to one or more embodiments described herein. The exemplary wake-up circuit 400 may comprise of an Ethernet PHY 402, a processor 404, a link LED 408 and P-Channel MOSFET (PMOS) 410. The Ethernet PHY 402 may receive link pulses 406, for example, from the first computing device 102. In response of receiving the link pulses 406, the Ethernet PHY 402 may output the trigger signal to trigger the link LED 408. The link LED 408 may be connected to a supply voltage at one end through a resistor R1. The output from the Ethernet PHY 402 may also be given as an input to a Gate terminal (G) of the PMOS 410. A source terminal (S) of the PMOS 410 may be connected to the supply voltage and a drain terminal (D) might be connected to the processor 404 through resistor R2. For an example, a low voltage input may be provided to the gate terminal and to another end of the link LED 408. The link LED 408 may glow and the PMOS 410 may produce an inverted output, i.e. a high voltage output at the drain terminal, thereby, activating the processor 404 to wake up from the sleep mode. Once the processor 404 activated, a data interface between the Ethernet PHY 402 and the processor 404 enables data transfer between them, in accordance with the various communication protocols, such as, but not limited to, EPC global, DOD, I2C, TCP/IP, IEEE 802.3, UDP, and 2G, 3G, 4G or 5G communication protocols.

Figure 5:
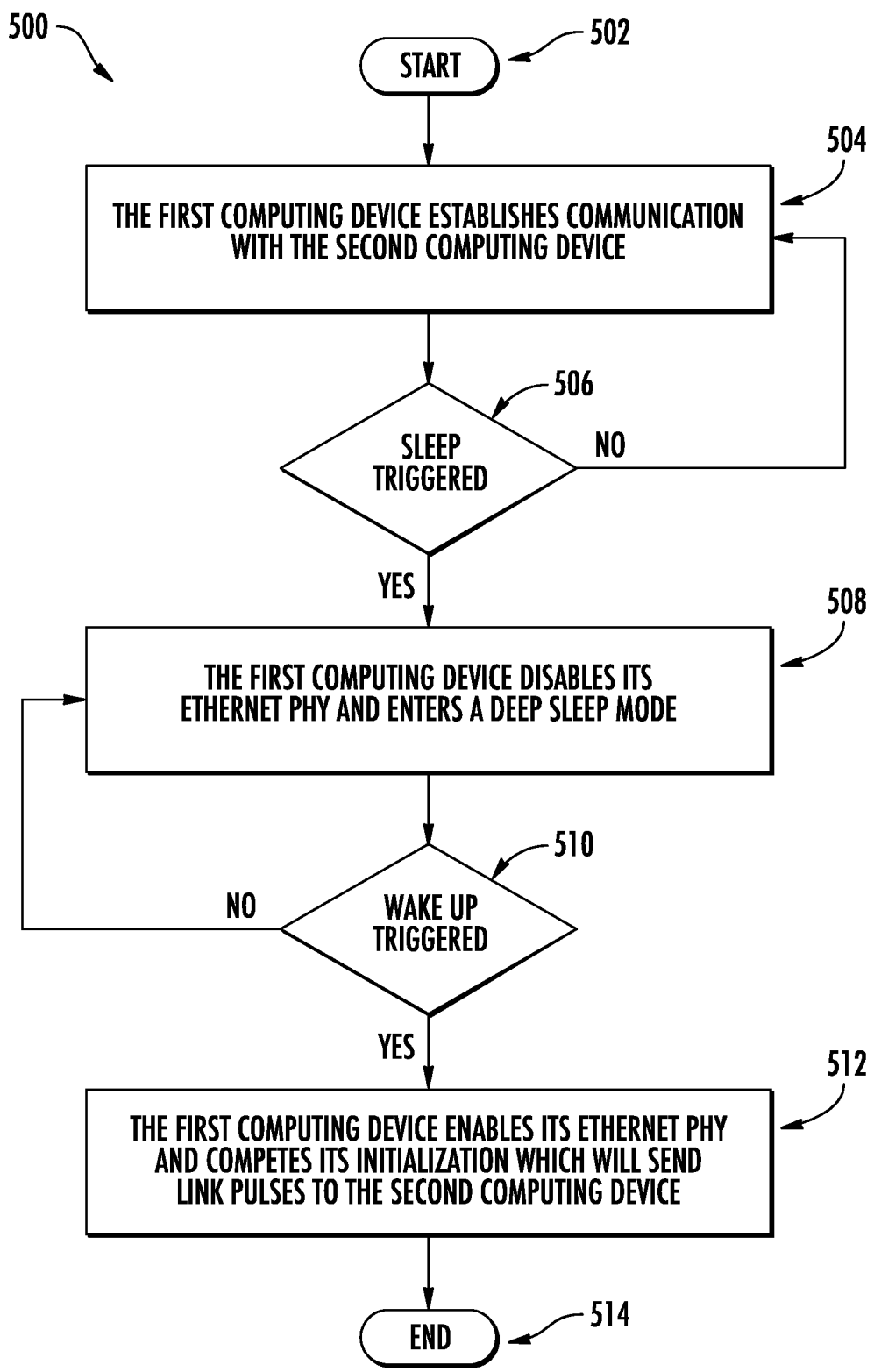
FIG. 5 illustrates a flowchart illustrating a method of operation of the first computing device, according to one or more embodiments described herein.

FIG. 5 illustrates a flowchart 500 illustrating a method of operation of the first computing device 102, according to one or more embodiments described herein. The process starts at step 502.

At step 504, the first computing device 102 may establish communication with the second computing device 104. As described earlier, the first computing device 102 may communicate with the second computing device 104 via at least one of the wireless connection, the wired connection, the Ethernet network, and/or the like.

At step 506, the first computing device 102 may determine if the sleep mode is triggered. If the sleep mode is triggered, then the control transfers to step 508. If sleep mode is not triggered, the first computing device 102 may continue to communicate with the second computing device 104, until the first computing device 102 receives the sleep command.

At step 508, the first computing device 102 may transit to the sleep mode. In accordance with this, the first computing device 102 before going to the sleep mode, disables all its component, for example, the Ethernet PHY (in FIG. 1, shown as 108) associated with it to reduce power consumption.

At step 510, the first computing device 102 may determine if the wakeup mode is triggered. As explained earlier, the first computing device 102 may receive the actuation signal from the sensor. The sensor may be external or internal to the first computing device 102. The sensor, for example, may be the motion sensor, the ignition sensor, the vibration sensor, or etc. The actuation signal may not be limited to only sensors. The actuation signal may be received to from the mobile device operating in the vicinity of the first computing device 102. The actuation signal may also be received from a hardware trigger given by the operator. If the wake-up mode is not triggered, the first computing device 102 may continue to stay in the sleep mode. In contrast, if the wake-up mode is triggered, the control transfers to step 512.

At step 512, on receiving the wake-up trigger, the first computing device 102 may transit to the wake-up mode, thereby, enabling the Ethernet PHY (shown as 108 in FIG. 1) which was disabled in the sleep mode. The first computing device 102 may then complete its initialization, i.e. enabling rest of the components for operation. The first computing device may then send the link pulses to the second computing device 104 for establishing the connection. In an example embodiment, the first computing device 102 and the second computing device 104 may also communicate with the central server via a network or a communication interface. For example, but limited to, via a Bluetooth connection, BLE (Bluetooth Low Energy) protocol, wireless fidelity (Wi-Fi), light fidelity (LiFi), wireless gigabit alliance (WiGig), ZigBee, Near Field Communication (NFC), magnetic secure transmission, radio frequency (RF), Ultrasound, 5G mm wave technology, etc.

The process ends at step 514.

Figure 6:
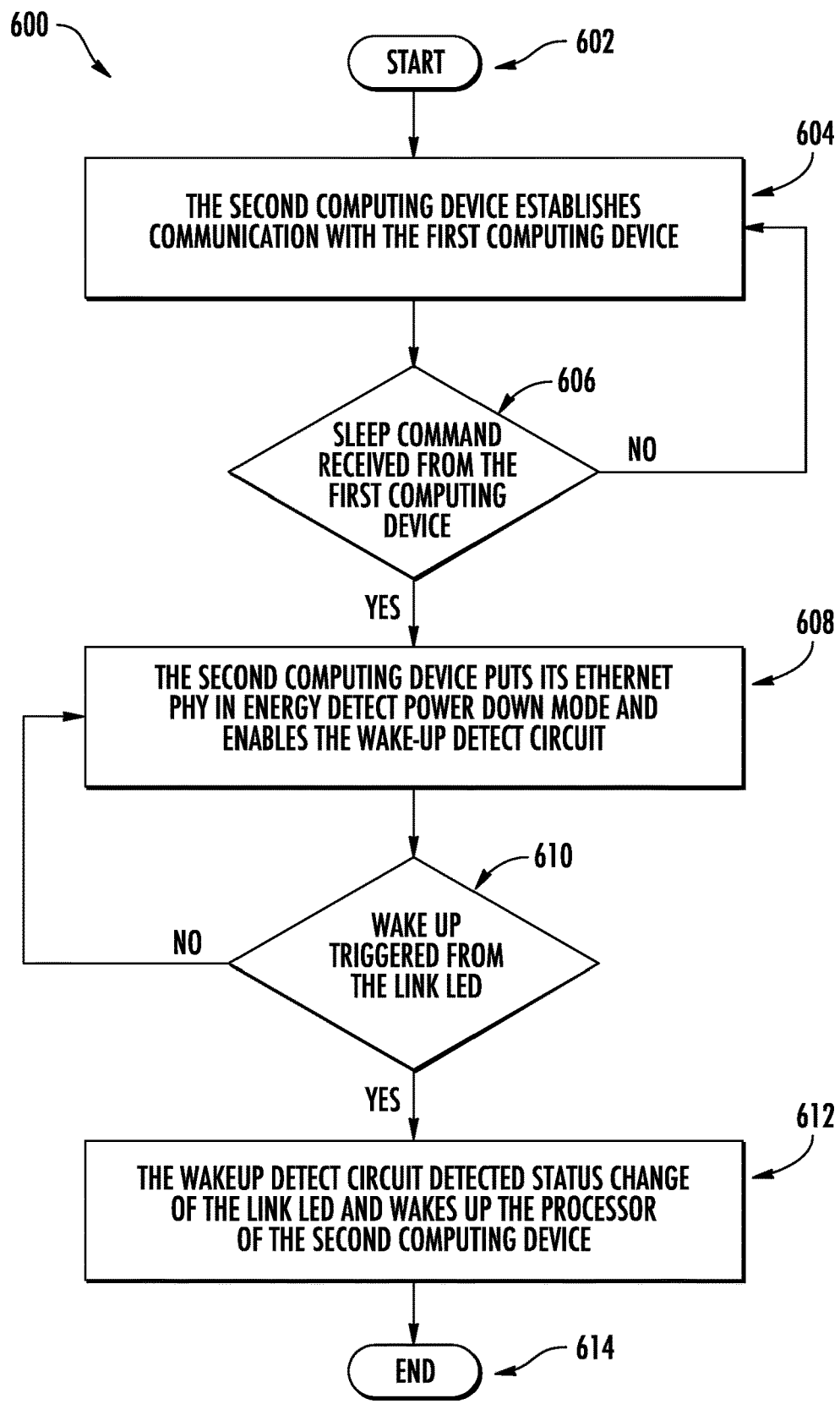
FIG. 6 illustrates a flowchart illustrating a method of operation of the second computing device, according to one or more embodiments described herein.

FIG. 6 illustrates a flowchart 600 illustrating a method of operation of the second computing device 104, according to one or more embodiments described herein. The process starts at step 602.

At step 604, the second computing device 104 establishes communication with the first computing device 102. The communication may be established in response of the second computing device 104 receiving a wake-up command from the first computing device 102. As described earlier, the first computing device 102 may communicate with the second computing device 104 via at least one of a wireless connection, a wired connection, an Ethernet network, and/or the like, in accordance with various wired and wireless communication protocols such as Transmission Control Protocol and Internet Protocol (TCP/IP), User Datagram Protocol (UDP), and 2G, 3G, 4G, or 5G communication protocols.

At step 606, the second computing device 104 determines if the sleep command received from the first computing device 102. If no sleep command received, the second computing device 104 may continue to communicate with the first computing device 102. However, if the sleep command is received, the control transfers to step 608.

At step 608, the second computing device 104 transits to an energy detect power down mode. In the energy detect power down mode, all the components of the second computing device 104 may be disabled or shut down, except the transmitter and the energy detect circuit. The energy detect circuit may be active so as to detect the FLP signals transmitted by the first computing device 102 to wake-up the second computing device 104.

At step 610, the second computing device 104 may determine if a wake-up is triggered from the link LED (shown as 116 in FIG. 1). The wake-up may be triggered by the link LED 116 in response of receiving the FLP signals transmitted by the first computing device 102 to wake-up the second computing device 104. If no wake-up is triggered, up the second computing device 104 continues to stay in the energy detect power down mode. If the wake-up is triggered from the link LED, The control transfers to step 612.

At step 612, the wake-up detect circuit detects the state change signal from the link LED 116 which may act as the wake-up trigger for the second computing device 104. In response of receiving the state change signal from the link LED 116, the second computing device 104 may wake up, thereby, waking up the processor of the second computing device 104.

The process ends at step 614.

Figure 7:
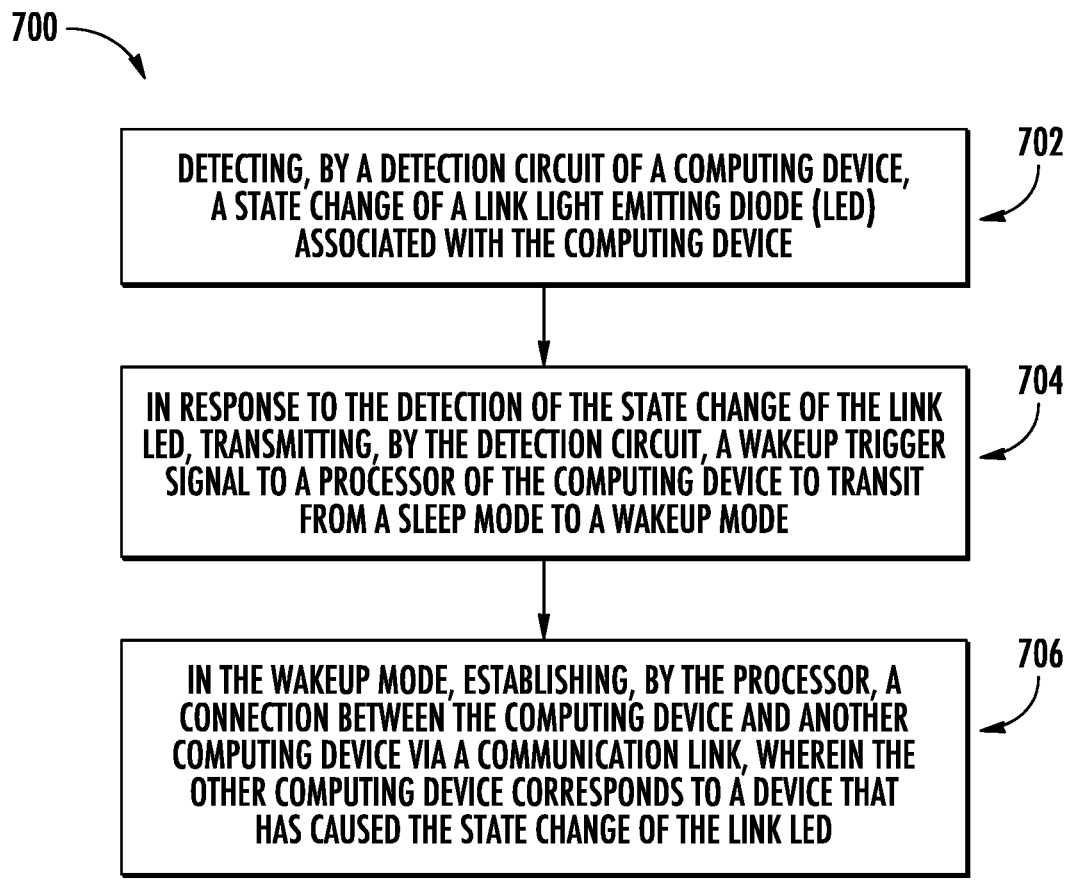
FIG. 7 illustrates a flow diagram representing a method of waking up a computing device by another computing device, according to one or more embodiments described herein.

FIG. 7 illustrates a flow diagram representing a method of waking up a computing device by another computing device, according to one or more embodiments described herein.

At step 702, a detection circuit of a computing device detects a state change of a link LED associated with the computing device. As discussed, the state change of the link LED may indicate reception of link pulses (or can say, FLP signals) by the detection circuit. In other words, the state of the link LED changes, for example, from LOW to HIGH based on receiving the link pulses.

At step 704, in response to the detection of the state change signal of the link LED, the detection circuit may transmit a wake-up trigger signal to a processor of the computing device to transit from a sleep mode to a wake-up mode. The control then transfers to step 706.

At step 706, in the wake-up mode, the processor establishes a connection with another computing device via a communication link. The other computing device may correspond to a device different from the computing device and that has caused the state change of the link LED. As explained earlier, the communication link may be but not limited to the wired interface, the wireless interface, or the Ethernet cable. In another example embodiment, the processor may establish the connection with the other computing device via a network interface. The network corresponds to a medium through which content and messages may flow between various computing devices in the system environment 100 (e.g., the first computing device 102 and the second computing device 104). Examples of the network may include wired and/or wireless networks, such as but not limited to, a Wireless Fidelity (Wi-Fi) network, a Wireless Area Network (WAN), a Local Area Network (LAN), and/or a Metropolitan Area Network (MAN). Various devices in the system environment 100 can connect to the network in accordance with various wired and wireless communication protocols such as Transmission Control Protocol and Internet Protocol (TCP/IP), User Datagram Protocol (UDP), and 2G, 3G, 4G, or 5G communication protocols.

Figure 8:
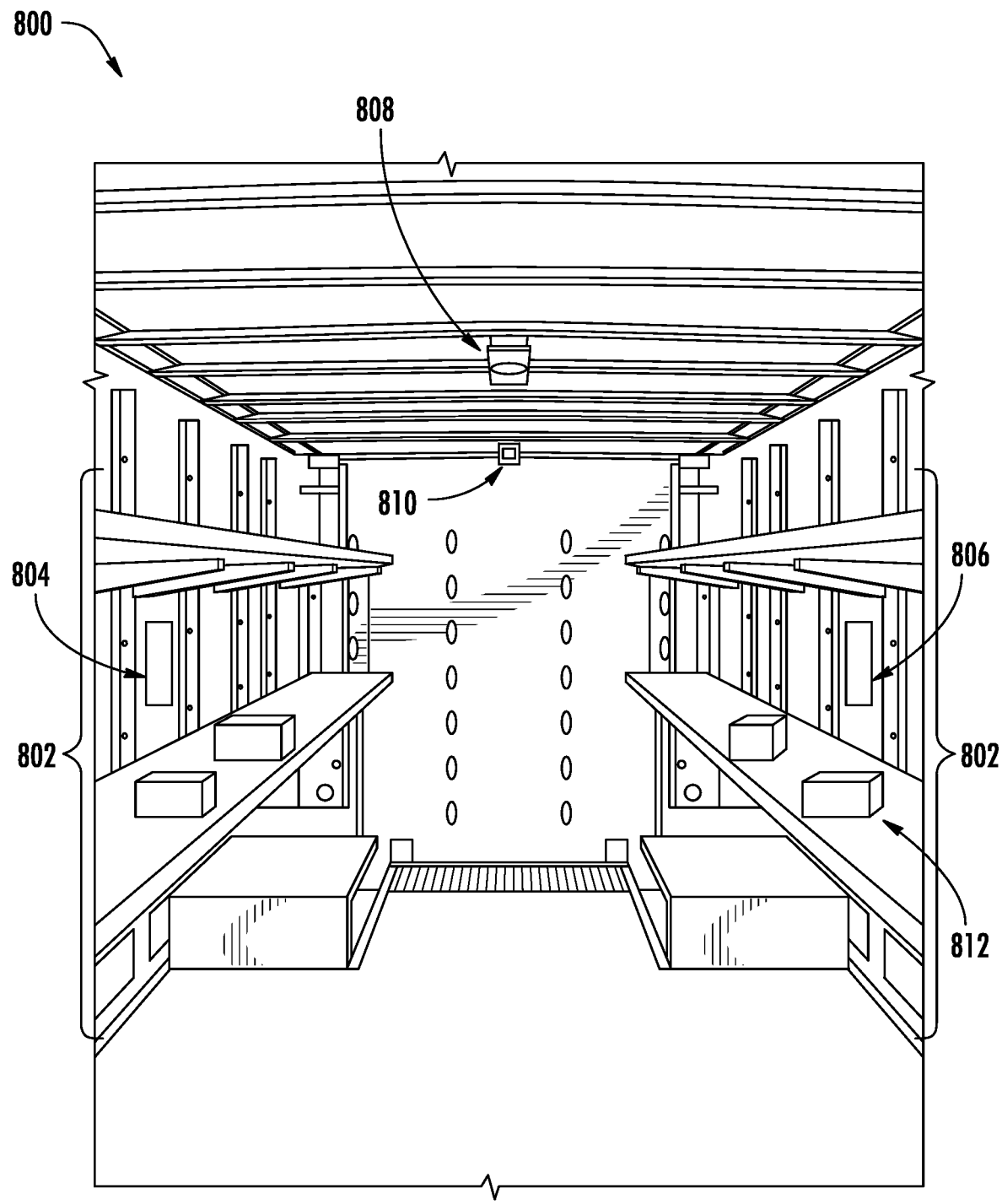
FIG. 8 illustrates an example of delivery vehicle cargo compartment, according to one or more embodiments described herein.

FIG. 8 illustrates an example of delivery vehicle cargo compartment, according to one or more embodiments described herein. This figure may also illustrate compartment of any parcel service car, package car that are used to deliver parcels at various locations. The arrangement in the cargo compartment may not be limited to the one shown in FIG. 8. The cargo compartment 800 may comprise a bay, disposed within an example delivery truck, and in which parcels may be transported. The cargo compartment 800 may comprise a cargo access door (not shown in figure), which may be disposed at one or more ends or sidewalls thereof. A bar code scanner 810 may be disposed at or near the access door and operable for scanning barcodes, with which parcels being loaded into the compartment 800 might be labelled.

Shelves 802, which may be retractable, foldable and/or otherwise adjustable, are disposed along one or more inner walls or bulkheads of cargo compartment 800. Parcels 812 may be transported as cargo on the shelves 802 and/or on a deck, which forms a floor of the cargo compartment 800.

The parcels 812 may include RFID tags or computer readable codes on a surface of the package as an item identifier. A laser pointer and/or projector 808 may be disposed on the inner surface of an overhead or ceiling, which is opposite to the deck. The barcode scanner 810 and the laser pointer 808 may be shown here as just an example but not at all limits the arrangement and operation in the cargo compartment 800.

The cargo compartment 800 further comprises a first computing device 804 mounted at one sidewall while a second computing device 806 mounted at the other sidewall. The mounting of the computing devices may not be limited to the shown arrangement. Normally, the first computing device 804 and second computing device 806 may be in the deep sleep state. During this deep sleep state, the first computing device 804 and the second computing device 806 may receive power from the backup battery. When a wakeup is triggered to the first computing device 804, for example, by receiving an actuation signal. As explained earlier, the actuation signal may be based upon a sensor either mounted on the delivery vehicle or present near the first computing device 804. For example, an ignition sensor may sense an ignition of the delivery vehicle and may transmit this sensed data to the first computing device 804. The first computing device 804 may wake-up from the deep sleep state based on this sensed data. In another example, the first computing device 804 may wake-up based on sensed data from the motion sensor, the vibration sensor, and/or like.

In another embodiment, the first computing device 804 may wake up from the deep sleep state based on detecting a presence of user within a threshold distance of the first computing device 804.

In yet another embodiment, the first computing device 804 may wake up from the deep sleep state based on receiving a command from the mobile device present in proximity. In some examples, the first computing device 804 may wake up from the deep sleep state based on sensing any of the above mentioned parameters either alone or in combination thereof. For example, the first computing device 804 may be triggered based on sensing the ignition signal as well as detecting any user in proximity.

The first computing device 804 on waking up may trigger the second computing device 806 to wake up from the deep sleep state. The second computing device 806 upon waking up may update the inventory database, for example, updating RFID data associated with any of the parcels 812.

In one exemplary embodiment, the user may come into the cargo compartment 800 to pick an intended parcels 812 for delivery at a destined location. On sensing the user motion inside the cargo compartment 800, the first computing device 804 may wakeup from the deep sleep state and may send the wake-up signal to the second computing device 806. The second computing device 806 may communicate with the central server to identify the intended parcel 812 to be delivered at a given location. Thus, on identification of the intended parcel 812, a visual identifier associated with the intended parcel may glow to let the user locate the parcel 812. After the user picks up the intended parcel 812 for delivery, the inventory database may be updated. The visual identifier may include a LED associated with the shelves 802, or an electronic tag associated with the shelves 802, or etc.

In another exemplary embodiment, the user may come into the cargo compartment 800 to pick the intended parcel 812 for delivery at the destined location. The user may issue a command from a mobile device, for example, by pressing a button, for example, "FIND" button on the mobile device. The mobile device may communicate with the first computing device 804 through Wi-Fi. This may trigger the first computing device 804 to wake up from the deep sleep state and thereby, wakeup the second computing device 806 from the deep sleep state. In the wake-up mode, the first computing device 804 and the second computing device 806 may receive power from the battery of the delivery truck.

In this way, example embodiments described herein provide methods and systems for power management of one or more computing devices using the link LED output. Pulling out the wakeup wire from the sensor to wake-up the computing devices might need additional wiring and may lead to labor issues. Therefore, using the link LED output as the wake-up signal for the computing devices reduces the need of additional wiring. Other advantages over direct enabling of the computing devices via the ethernet is that the ethernet PHY of the computing device need not to be active all the time and also processor might not need to monitor the ethernet interface to come back to active state which consumes more power. By using the link LED, the processor may stay in lowest power state, i.e. in the "DEEP SLEEP" mode until it receives a hardware trigger from the Link LED.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computing device comprising:
 a communication interface configured to receive link pulses from another computing device over a communication link, wherein the link pulses correspond to a burst of pulses transmitted by the other computing device to the computing device;

an energy detection circuit configured to change a state of a link light emitting diode (LED) associated with the computing device in an instance in which an energy of the link pulses is greater than a threshold energy level;

a wake-up detect circuit configured to detect the change in the state of the link LED associated with the computing device, wherein the wake-up detect circuit is configured to:

in response to the detection of the change in the state of the link LED, transmit a wakeup trigger signal to a processor to transit from a sleep mode to a wake-up mode; and wherein the processor is configured to:

in the wake-up mode, establish a connection between the computing device and the other computing device via the communication link, wherein the other computing device corresponds to a device that has caused the change in the state of the link LED by transmitting the link pulses.

2. The computing device of claim 1, wherein the link pulses correspond to energy signal that is detected by the energy detection circuit of the computing device.

3. The computing device of claim 2, wherein the energy signal is transmitted by the other computing device in response to the other computing device receiving an activation signal from a sensor, wherein the sensor includes at least one of a motion sensor, a vibration sensor, or an ignition sensor.

4. The computing device of claim 3, wherein the processor in the wake-up mode waits for a predefined time period to receive the energy signal, before transiting to the sleep mode.

5. The computing device of claim 1, wherein the processor is further configured to:

transit to the sleep mode based on receiving a sleep command from the other computing device.

6. The computing device of claim 1, wherein the communication link corresponds to at least one of a wireless link or a wired link.

7. The computing device of claim 1 wherein the processor is further configured to:

in response of establishing the connection with the other computing device, update an inventory database based on at least an instruction or a command received from the other computing device.

8. A method comprising:

receiving, by a communicating interface of a computing device, link pulses from another computing device over a communication link, wherein the link pulses correspond to a burst of pulses transmitted by the other computing device to the computing device;

changing, by an energy detection circuit of the computing device, a state of a link light emitting diode (LED) associated with the computing device in an instance in which an energy of the link pulses is greater than a threshold energy level;

detecting, by a wake-up detect circuit of the computing device, the state change of the link LED associated with the computing device;

in response to the detection of the state change of the link LED, transmitting, by the wake-up detect circuit, a wakeup trigger signal to a processor of the computing device to transit from a sleep mode to a wake-up mode; and in the wake-up mode, establishing, by the processor, a connection of the computing device with the other computing device via the communication link, wherein the other computing device corresponds to a device that has caused the state change of the link LED.

9. The method of claim 8, wherein the link pulses correspond to energy signal that is detected by the energy detection circuit of the computing device.

10. The method of claim 9, wherein the detection of the energy signal is transmitted by the other computing device in response to the other computing device receiving an activation signal from a sensor, wherein the sensor includes at least one of a motion sensor, a vibration sensor, or an ignition sensor.

11. The method of claim 8, further comprising:

in response of establishing the connection with the other computing device, updating an inventory database based on at least an instruction or a command received from the other computing device.

12. The method of claim 11, wherein the updating of the inventory database includes updating information related to an RFID tag associated with a product.

13. The computing device of claim 2, wherein the change in the state of the link LED comprises a change in a voltage output from the link LED.

14. The computing device of claim 13, wherein the voltage output is detected at a drain terminal of the link LED.

* * * * *